June 4, 1940.   J. P. RATHBUN   2,203,364
SEALING MEANS FOR HIGH PRESSURE HEADS
Filed Dec. 15, 1938
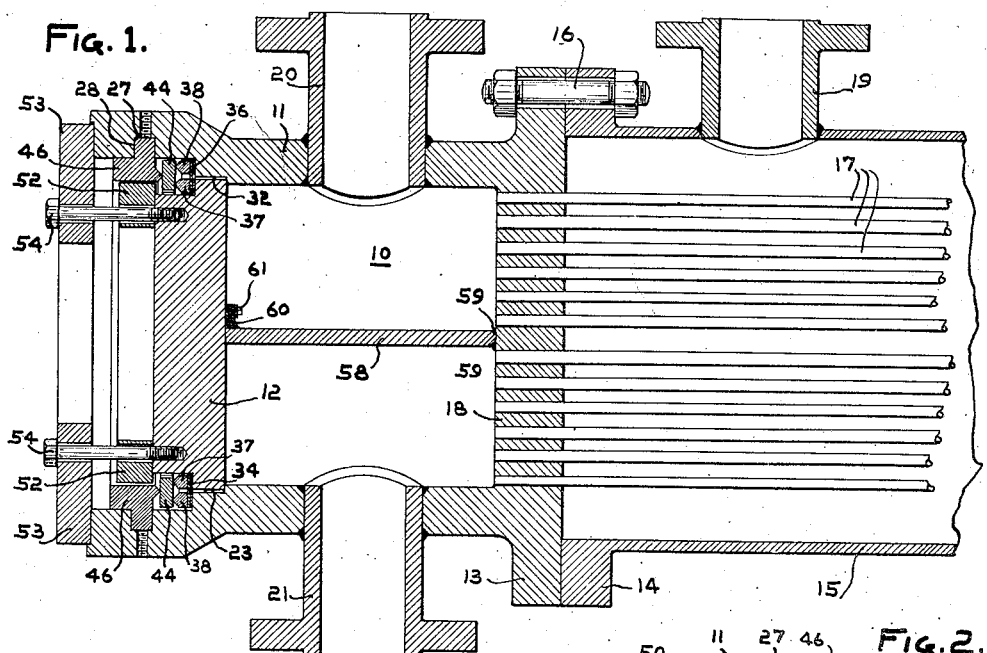
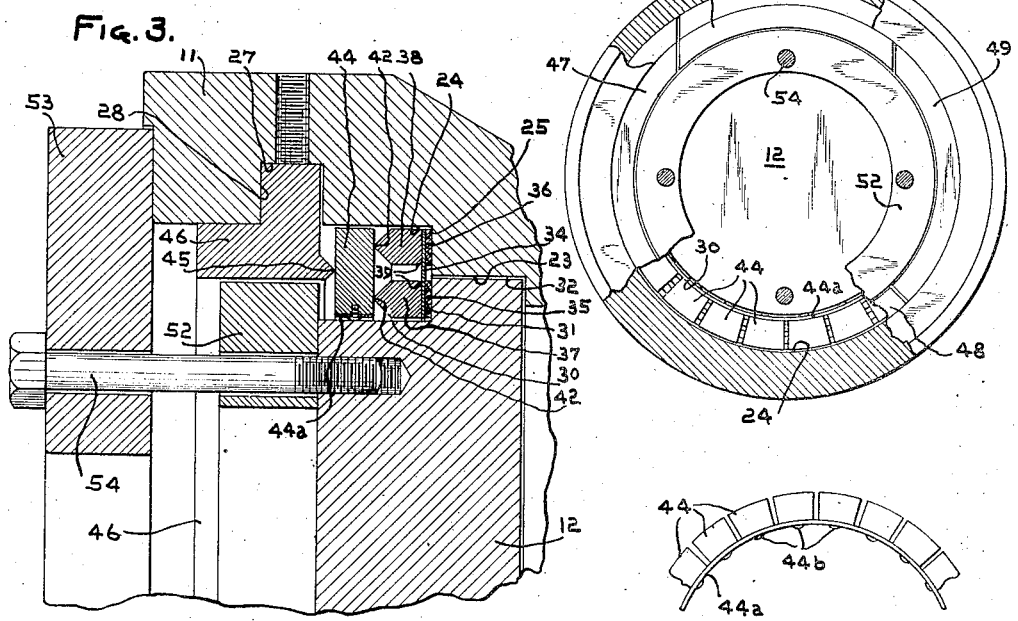
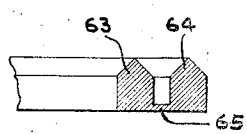
WITNESSES:
INVENTOR
JOHN P. RATHBUN.
BY
ATTORNEY Patented June 4, 1940

2,203,364

UNITED STATES PATENT OFFICE 2,203,364

SEALING MEANS FOR HIGH PRESSURE HEADS

John P. Rathbun, Prospect Park, Pa., assignor to Westinghouse Electric & Manufacturing Company, East Pittsburgh, Pa., a corporation of Pennsylvania Application December 15, 1938, Serial No. 245,852

5 Claims. (Cl. 220—46)

The invention relates to closures for pressure vessels, more particularly to covers or closure members for high-pressure heads of heat exchange apparatus, and has for an object the provision of a construction permitting the use of a pressure-sealing gasket of the flat or thin type as distinguished from the soft gasket of relatively large cross section generally used with pressure-sealed heads.

Another object of the invention is the provision of a straddle-type gasket seal for a joint together with means for applying equalized pressures to portions of the gasket at either side of the joint.

A further object of the invention is the provision of equalizing means for evenly dividing the sealing pressure between a seal associated with the cover and a seal associated with the body of a high-pressure head.

These and other objects are effected by my invention as will be apparent from the following description and claims taken in connection with the accompanying drawing, forming a part of this application, in which:

Fig. 1 is a longitudinal sectional view of a portion of the tubular heat exchanger constructed in accordance with the invention;

Fig. 2 is an end elevational view of the structure shown in Fig. 1, with portions broken away for the sake of clearness;

Fig. 3 is an enlarged sectional view of a portion of the structure of Fig. 1;

Fig. 4 is a detail view, showing a plurality of the equalizing blocks; and

Fig. 5 is a fragmentary sectional view of a modified construction of the pressure rings and diaphragm.

In the drawing there is shown a high-pressure head 10 including a body portion 11 and a cover 12. The body member has a flange 13 at one end by which it is secured to a corresponding flange 14 of a tubular heat exchanger shell 15, by suitable means, such as bolts 16. A plurality of tubes 17 have their terminal portions secured in the tube plate wall 18 of the body member and extending longitudinally through the shell to the return end (not shown) of the heat exchanger. As is usual, the shell 15 has an inlet 19, and, where the heat exchanger is of the two-pass type, as herein illustrated, the head is provided with an inlet 20 and an outlet 21 for the admission and discharge, respectively, of fluid under high pressure.

The body member 11 has an opening at one end which is counterbored, at 23, to receive the cover. The opening is further counterbored, at 24, to provide a radially-extending sealing shoulder or seat 25 disposed axially between the inner and outer surfaces of the cover 12. Outwardly of the cover, the wall has an inwardly-opening circumferential recess or groove 27 providing a radially-extending thrust shoulder 28 facing the seat 25.

The cover 12 is rabbetted, at 30, to provide an outwardly-facing radial seat 31 adjacent to and substantially flush with the seat 25 on the head, the adjacent edges of the seats 31 and 25 defining an annular joint 32 between the cover and the body portion.

Leakage of fluid at the joint 32 is prevented by the provision of a seal of the straddle-type comprised by a flexible annular diaphragm member 34 resting on a pair of relatively thin and flat annular gaskets 35 and 36, which in turn are disposed on the seats 31 and 25, respectively. Sealing pressure is applied to the diaphragm and gaskets through a pair of annular pressure rings 37 and 38, concentrically disposed and radially aligned with the gaskets 35 and 36, respectively. The adjacent inner corners of the pressure rings are beveled or rounded, as at 39, to avoid cutting of the diaphragm 34 should slight movement thereof occur due to shifting of the cover upon application of internal pressure to the head.

The outer faces of the pressure rings 37 and 38 are V-shaped in cross section, providing fulcrum-edges or relatively narrow surfaces 42. These fulcrum-edges engage the inner surfaces of an annular series of equalizing blocks 44 which, in turn, abut an annular fulcrum-edge 45 carried by the inner surfaces of an annular sectional shear ring 46, disposed in the groove 27 in abutting relation to the thrust shoulder 28 thereof. The equalizing blocks are retained in assembled relation in any suitable manner, as by an annular band 44a to which the blocks are secured, as by bolts 44b.

To facilitate assembly of the shear ring 46 in the groove 27, the former is divided into a plurality of arcuate sections or shear pieces, for example, 47, 48, 49 and 50. To provide for contiguity of adjacent end faces of the sections and for insertion and removal of the latter, all of such faces extend radially except the faces at either end of the section 50, which are parallel, thereby providing for insertion of the latter section last and the removal thereof first.

To prevent radial inward displacement of the shear ring sections, a retaining ring 52, having an external diameter slightly less than the internal diameter of the shear ring, is disposed within the latter.

To hold the cover and its associated parts in assembled relation, and to maintain a preliminary sealing pressure on the seals, the bolting flange 53 is applied to the outer end of the body member, and has bolts 54 extending axially therethrough with their inner ends threadedly received in the cover 12. Tightening of these bolts provides an initial sealing pressure and maintains the parts in assembled relation until such time as the high fluid pressure is applied to the interior of the high-pressure head. The bolts 54 are so located as to pass through openings in the retaining ring 52 to hold the same in operative position. However, it will be obvious that if desired, additional bolts may be used for the purpose of securing this ring to the cover independently of the clamping bolts 54.

When the heat-exchanger is of the two-pass type, as herein illustrated, the head is divided interiorly by a partition 58, separating the two tube passes. Preferably, the partition is secured to the tube plate wall 18 and the cylindrical side walls of the body member by welding, as at 59. The outer edge of the partition is sealed with respect to the inner surface of the cover 12 against inter-pass leakage by any suitable means, such as the laminated structure 60 secured to the cover by bolts 61.

In Fig. 5, there is shown a slight modification of a portion of the sealing structure wherein the pressure rings 63 and 64 are connected by a thin flexible web 65, which takes the place of the annular diaphragm 34, previously described.

It will be apparent that the construction herein disclosed provides an arrangement whereby pressure-sealing of the joint between the cover and the body member is secured, while at the same time permitting the use of relatively thin, flat gaskets of a type which is generally considered to be preferable to the soft gasket of relatively large cross section heretofore necessary in pressure-sealed constructions.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In combination, a pair of members providing a pressure space and having a joint therebetween, said members having sealing surfaces at the side thereof remote from the pressure space, gaskets fitting said surfaces, a flexible metallic member engaging the gaskets and straddling the joint, and means including equalizing mechanism for exerting pressures on the gasket contacting portions of the straddling member.

2. In combination, a pressure —vessel including a cylindrical wall portion, a sealing surface on said wall portion, a cover for the pressure vessel, a sealing surface on said cover, gasket means on the sealing surfaces, a flexible metallic member overlying said gasket means, and means including equalizing mechanism for exerting pressures on the portions of the metallic member overlying the gasket means.

3. Apparatus of the character described comprising a pressure-sustaining body member including a cylindrical wall portion; said wall portion having an interior outwardly-facing seat arranged intermediately of the length thereof and having a cylindrical bore extending from the seat to its outer end with an annular groove opening into the bore and providing a thrust shoulder oppesed to said outwardly-facing seat, said wall portion also having a cylindrical bore extending inwardly from the seat; a disc-like cover disposed in said last-mentioned bore, said cover having an outwardly-facing seat adjacent to, and substantially flush with, the seat on the wall portion, the adjacent edges of the seats defining an annular joint between the cover and the body member; annnular flexible sealing means of the straddle-type on said seats and sealing the joint defined thereby; a plurality of shear pieces abutting the thrust shoulder; and apparatus positioned between the sealing means and the shear pieces for transmitting internal pressure loads from the cover to said shear pieces and including means serving to equalize the sealing pressures on the two seats.

4. Apparatus of the character described comprising a pressure-sustaining body member including a cylindrical wall portion; said wall portion having an interior outwardly-facing seat arranged intermediately of the length thereof and having a cylindrical bore extending from the seat to its outer end with an annular groove opening into the bore and providing a thrust shoulder opposed to said outwardly-facing seat, said wall portion also having a cylindrical bore extending inwardly from the seat; a disc-like cover disposed in said last-mentioned bore, said cover having an outwardly-facing seat adjacent to, and substantially flush with, the seat on the wall portion, the adjacent edges of the seats defining the joint between the cover and the body member; an annular flexible sealing diaphragm adjacent the seats and straddling the joint defined thereby; annular gasket means between the diaphragm and the seats; a plurality of shear pieces abutting the thrust shoulder; and apparatus positioned between the diaphragm and the shear pieces for transmitting internal pressure loads from the cover to said shear pieces, and including means serving to equalize the sealing pressures on the seats.

5. A structure as specified in claim 4, wherein the last-mentioned means is comprised by a pair of concentrically disposed annular pressure rings axially aligned with the seats, said rings having flat inner sides contiguous to the outer surface of the sealing diaphragm and V-shaped outer sides providing spaced concentric annular fulcrum-edge supports; an annular series of equalizing blocks having their inner surfaces abutting said knife-edge supports; and an inwardly-directed annular fulcrum-edge ridge on the inner surfaces of the shear pieces, said ridge being disposed axially concentric to, and radially midway of, said annular fulcrum-edge supports and abutting the outer surfaces of the equalizing blocks.

JOHN P. RATHBUN.